United States Patent
Blankenship et al.

[19]

[11] Patent Number: 6,009,793
[45] Date of Patent: Jan. 4, 2000

[54] COFFEE MAKER

[75] Inventors: Paul M. Blankenship, Glen Allen; Martin Brady, Chesterfield; Derwood S. DeLong, Goochland County; Michael J. Morecroft, Glen Allen; Mark K. Romandy, Midlothian; Dean C. Warner, Glen Allen, all of Va.

[73] Assignee: Hamilton Beach/Proctor-Silex, Inc., Glen Allen, Va.

[21] Appl. No.: 08/704,320

[22] Filed: Sep. 12, 1996

Related U.S. Application Data

[60] Provisional application No. 60/023,004, Aug. 2, 1996.

[51] Int. Cl.[7] .................................................... A47J 31/00
[52] U.S. Cl. .................................. 99/307; 99/305; 99/306
[58] Field of Search ............................ 99/295, 304, 305, 99/306, 307, 308, 309, 310, 311, 312, 316

[56] References Cited

U.S. PATENT DOCUMENTS

| | | |
|---|---|---|
| D. 240,386 | 7/1976 | Stuetzer . |
| D. 345,883 | 4/1994 | Maass . |
| D. 378,970 | 4/1997 | Brady et al. . |
| 1,632,342 | 6/1927 | Lambert . |
| 3,593,650 | 7/1971 | Martin et al. . |
| 4,467,707 | 8/1984 | Amiot . |
| 4,634,838 | 1/1987 | Berz ........................................ 99/306 X |
| 4,770,090 | 9/1988 | Woon et al. . |
| 5,165,327 | 11/1992 | Ferrara, Jr. ................................ 99/307 |
| 5,251,541 | 10/1993 | Anson et al. ........................... 99/307 X |
| 5,301,600 | 4/1994 | Medema . |
| 5,485,778 | 1/1996 | Ullmann . |

FOREIGN PATENT DOCUMENTS 2234628  1/1974  Germany ................................. 99/304

OTHER PUBLICATIONS

Six photographs (AR1–AR6) showing Black & Decker coffeemaker Model DCM20WH admitted to be prior art. Unpublished description of Black & Decker coffee maker Model DCM20WH entitled "Description of Reference AR" prepared for this IDS.

*Primary Examiner*—Reginald L. Alexander
*Attorney, Agent, or Firm*—Roger S. Dybvig

[57] ABSTRACT

A coffee maker has a housing having a upstanding tower, a carafe support platform extending horizontally forward from the lower end of the tower, and a fixed, tubular filter basket support extending horizontally forward from the upper end of the housing above the platform. A horizontal filter basket cover, including a water spreader, is disposed above the filter basket support and carried by the housing for pivotal movement about a vertical axis. A cover pivotal about a horizontal axis is provided over a water reservoir defined by the housing. A valve mechanism is provided that operates upon pivoting of the filter basket cover to selectively permit heated water to be supplied to the water spreader, thereby preventing burns from heated water when the water spreader is not located above the filter basket support. The coffee maker also includes an electronic controller having a control pad on the front surface of the housing platform. A pivotal cover is provided to shield the control pad from spilled coffee. To permit the filter basket to be easily removed from the filter basket support, the filter basket is provided with a pivotal bail.

17 Claims, 14 Drawing Sheets

COFFEE MAKER

CROSS-REFERENCE TO RELATED APPLICATION

This application claims the benefit of U.S. Provisional application Ser. No. 60/023,004, filed Aug. 2, 1996.

FIELD OF THE INVENTION

This invention relates to automatic drip coffee makers and, although not so limited, to automatic drip coffee makers for household counter top use.

BACKGROUND OF THE INVENTION

Typical automatic drip coffee makers include a removable filter basket in which is deposited a paper or other filter that holds ground coffee. The filter basket is removable from the coffee maker housing to permit the filter to be easily deposited in or removed from the filter basket and to permit the coffee grounds to be easily placed in the filter.

The filter basket has commonly been supported by the coffee maker housing in one of two ways. In some designs, the filter basket has a flange around its circular outer margin which is supported on a horizontal, semicircular support rail on the housing, in which case the filter basket is removed from the housing by sliding it horizontally along the rail, typically by a handle extending from the filter basket. In other designs, the filter basket is pivotally mounted relative to the housing for movement about a vertical axis, whereby the filter basket can swing out from beneath a fixed top cover and can then be removed from the housing, if desired. The top cover typically includes a water spreader that receives heated water and distributes the water at least somewhat evenly over the coffee grounds in the filter basket.

It has been found that the use of a pivotal filter basket has several disadvantages. For example, the sections of the coffee maker housing supporting the pivotal filter basket are typically thin-walled in construction, which permits the filter basket to sag or droop when pivoted to an open position. In addition, removal and replacement of the pivotal filter basket for cleaning or removal of spent coffee grounds may be tedious and time consuming.

Some coffee makers have been constructed with a fixed filter basket or a fixed filter basket support, which overcomes the weak, sagging appearance commonly found in coffee makers having pivotal filter baskets. In such coffee makers, the filter basket is typically removed from the fixed support along a vertical axis. Because the filter basket is typical located beneath a top cover, the coffee makers were provided with a pivotal top cover. In addition, such coffee makers also typically include a valve mechanism that prevents heated water from being sprayed from the water spreader in the top cover when the top is open, which could lead to burns or other serious injury.

In coffee makers having such pivotal top covers, the to cover is pivoted about a horizontal axis. Such a construction requires the coffee maker to be located on a counter top with sufficient head room above the coffee maker to permit the top cover to be fully opened. This is a disadvantage in situations in which the space above the counter is limited, as is common in many homes, apartments, and condominiums.

SUMMARY OF THE INVENTION

A coffee maker in accordance with this invention comprises a housing defining a water reservoir and a filter basket support carried by the housing in fixed relation thereto. A filter basket is removably supported in the filter basket support, and a filter basket cover is carried by the housing and pivotally movable relative thereto about a vertical axis. The filter basket cover may be pivoted between a closed position covering the filter basket and an open position providing access to the filter basket for removal thereof from the filter basket support. A dust cover, which is substantially coplanar with the filter basket cover, covers the water reservoir fill port. The fill port dust cover is pivotal about a horizontal axis to enable one to pour water into the reservoir. It is relatively narrow so that, when pivoted to its open position, it adds little to the overall height of the coffee maker.

The filter basket cover has one or more hot water exit apertures that receive heated water from a hot water delivery tube connected to an automatic drip heater assembly in the housing which communicates with the water reservoir. The heated water passes through the exit apertures in the filter basket cover and onto coffee grounds in the filter basket, thereby producing brewed coffee.

Further in accordance with this invention, the coffee maker is provided with a valve assembly intermediate the hot water delivery tube and the filter basket. The valve assembly prevents heated water from being delivered through the hot water exit apertures in the filter basket cover when the filter basket cover is in the open position. The valve assembly comprises a valve body extending along a vertical axis and having an inlet connected to the hot water delivery tube, an axially-extending, water supply port communicating with the inlet, and a water return port opening to the water reservoir. A valve closure member is disposed within the valve body and is rotatable about a vertical axis. The valve closure member has an axially-extending water delivery port and defines a bypass passageway. The valve closure member is rotatable between a first position wherein the water delivery passageway is aligned with and overlies the water supply port and a second position wherein the water delivery port is not aligned with the water supply port and the bypass passageway overlies the water return port. As a result, heated water from the hot water delivery tube passing through the water supply port when the valve closure member is in the second position is transferred through the bypass passageway and back into the water reservoir through the water return port.

A coffee maker in accordance with this invention generally includes a carafe supporting platform forming part of the housing and may include an electronic controller including a timer capable of initiating a brewing cycle at a preset time The platform has a front surface on which manually-operable control buttons for the electronic controller are mounted. A pivotal dust cover is mounted on the platform and movable to a closed position covering the surface. Preferably, the electronic controller includes a digital clock display, in which case the dust cover has a window that is aligned with the clock display when the dust cover is in its closed position.

Other objects and advantages will become apparent from the following description in conjunction with the accompany drawings.

DETAILED DESCRIPTION

Figure 1:
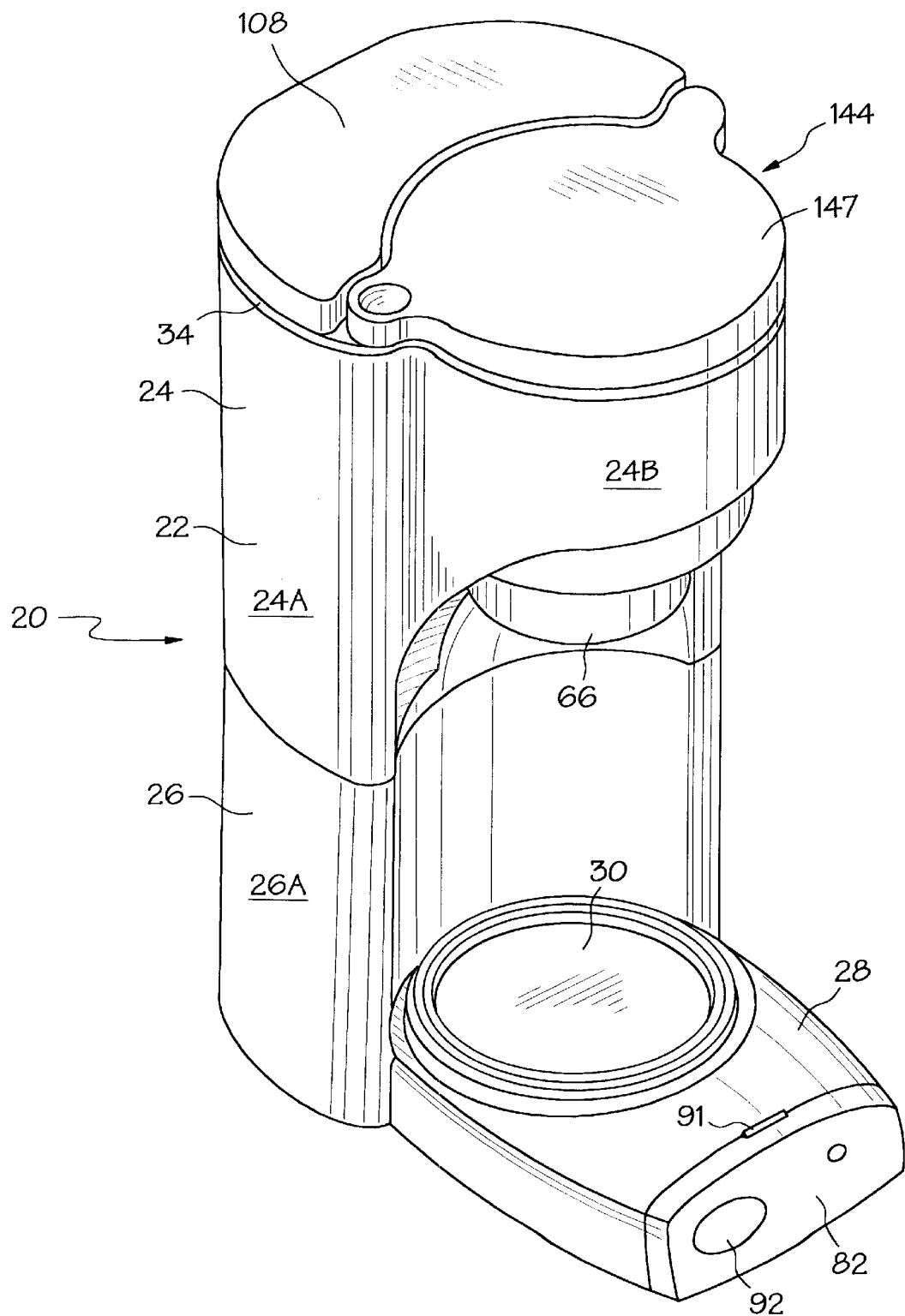
FIG. 1 is a perspective view of a coffee maker in accordance with this invention.
Figure 2:
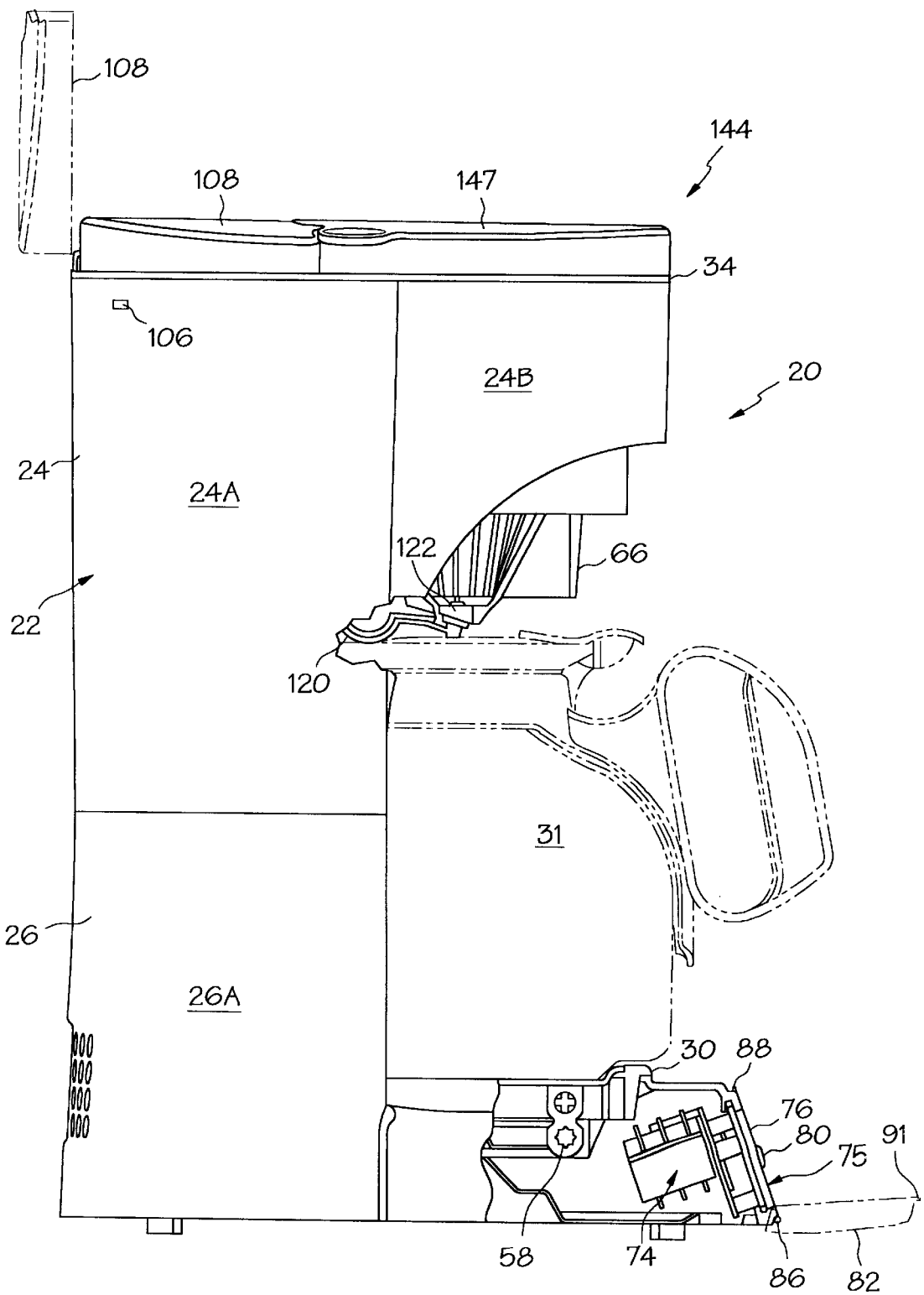
FIG. 2 is a side elevation view of the coffee maker of FIG. 1 with parts cut away and parts in cross section.

With reference to FIGS. 1 and 2, a coffee maker in accordance with this invention, generally designated 20, comprises a housing 22 formed from an upper housing section 24 and a lower housing section 26. The lower housing section 26 includes a platform 28 having a warmer plate 30 which supports a carafe 31. The upper housing 24 defines a water reservoir 32 and supports a one-piece fill port and filter basket support member, generally designated 34.

The housing sections 24 and 26 are formed from a suitable thermoplastic material, such as polypropylene, and are secured together to form the housing 22. The lower housing section 26 has an upstanding, generally crescent-shaped tower section 26A.

Similarly, the upper housing section 24 has a depending, generally crescent-shaped tower section 24A. When the housing sections 24 and 26 are secured together to form the housing 22, a mating portion of the upper housing section 24 is received with in the lower housing section 26 so that the junction between the upper housing section 24 and the lower housing section 26 is smooth, thus giving the housing 22 a unitary appearance.

Figure 3:
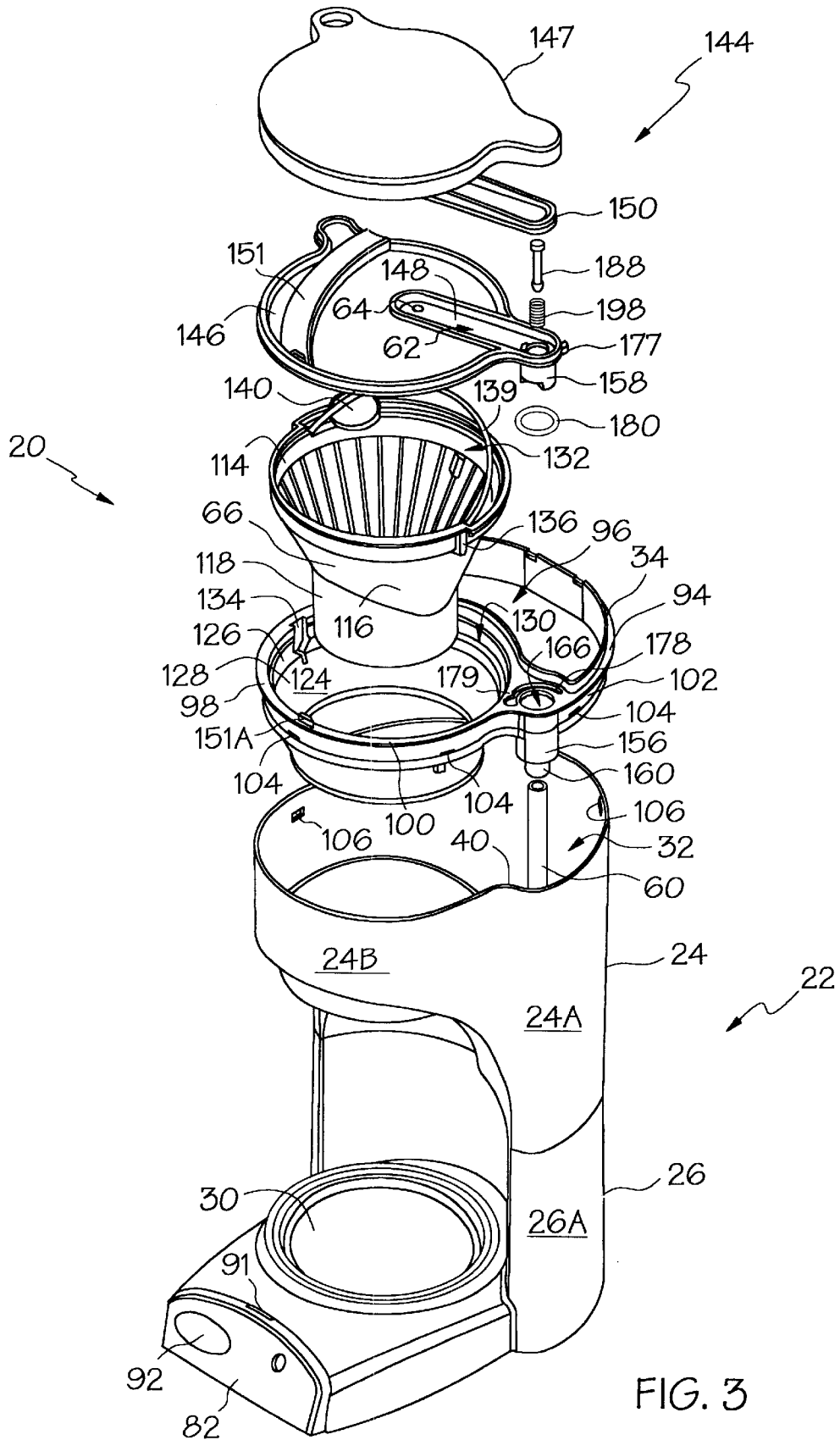
FIG. 3 is an exploded perspective view of the coffee maker of FIGS. 1 and 2 but not showing a carafe or water reservoir dust cover shown in FIGS. 1 and 2.
Figure 4:
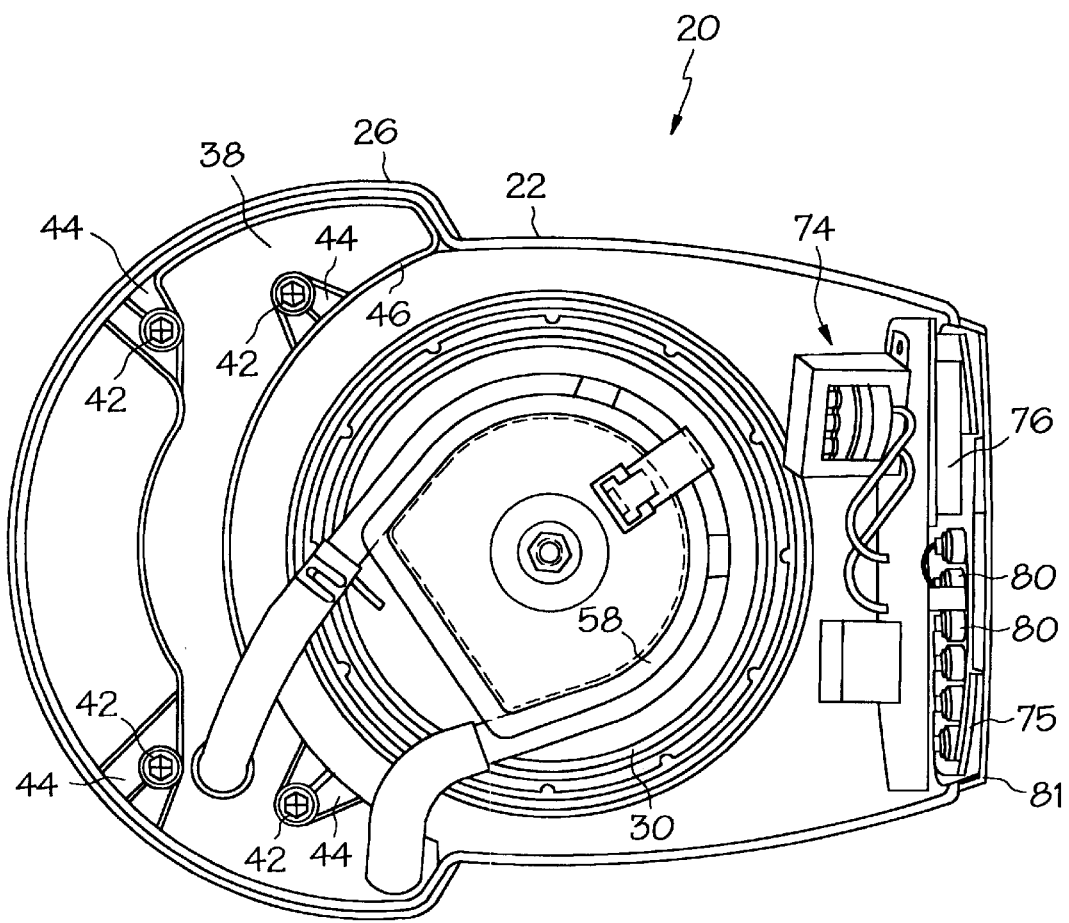
FIG. 4 is a bottom plan view of the coffee maker of FIG. 1 with its bottom cover removed.

With reference also to FIG. 3, the tower section 24A of the upper housing 24 has an imperforate floor 38 that cooperates with the wall 40 of the upper housing section 24 to define the water reservoir 32. Four integral cylindrical shafts (not shown) extend downwardly from the floor 38 and are secured by screws 42 to corresponding tabs 44 projecting horizontally inward from the wall 46 of the lower housing section 26. As a result, the upper housing section 24 is secured atop the lower housing section 26. Of course, the housing sections 24 and 26 may be secured together in any other suitable manner.

The platform 28 of the lower housing section 26 extends perpendicularly forward from the tower section 26A of the lower housing section 26. The platform 28 supports a conventional carafe supporting and warmer plate 30 that is heated by a conventional automatic drip heater assembly 58, as well known. The warmer plate 30 has a non-stick coating, such as Teflon. In operation, water in the reservoir 32 is heated by the automatic drip heater assembly 58 from which it travels up a hot water delivery tube 60 and over a water spreader 62, as will be described below in further detail. The heated water falls through a hot water exit aperture 64 in the water spreader 62 and onto coffee grounds located within a paper or other filter (not shown) deposited in a filter basket 66, thereby producing brewed coffee. In this respect, it will be understood that more than one hot water exit aperture 64 may be employed in the water spreader 62. The brewed coffee flows from the filter basket 66 into the carafe 31.

Referring particularly to FIGS. 2 and 3, the coffee maker 20 is provided with an electronic controller, generally designated 74, for operating the coffee maker 20. The controller 74 includes electronic circuitry for switching the coffee maker 20 on and off and a clock/timer for initiating a brewing cycle at a predetermined time. The controller 74 also includes a display and control pad 75 having a digital clock display 76 and several control buttons 80, which buttons 80 can be manually depressed to activate the electronic controller to switch the coffee maker 20 on and off and to set the clock/timer. The display and control pad 75 extends through an opening (not shown) in the front surface 81 of the platform 28 and lies flush therewith.

A suitable electronic controller 74 is commercially-available from Worldtronics International, Inc., Oglesby, Ill., and includes an automatic timer circuit as disclosed in U.S. Pat. No. 4,566,802, which timer circuit permits a brewing cycle to be automatically initiated once at a preset time. Thus, the automatic brew cycle is initiated on only a single day, rather than being repeated each day at the preset time. Otherwise, the electronic controller 74 may be entirely conventional and the details thereof are not important to the understanding of this invention.

To shield the clock display 76 and the control buttons 80 from spilled coffee and other debris, a clock dust cover 82 is provided to cover the front surface 77 of the platform 28, thereby covering the display and control pad 75. The cover 82 has mutually-confronting pins (not shown) at each end thereof that are received within notches or apertures 86 in opposite sides of the platform 28. The cover 82 is pivotal about the pins 84 between a closed position covering the surface 74, as shown in FIGS. 1 and 3, and an open position providing access to the control buttons 80, as shown in broken lines in FIG. 2. An upstanding tab 88 is provided near the front edge of the platform 28 and cooperates with a corresponding recess 90 in the cover 82 to secure the cover 82 in its closed position. A separate finger-engageable tab 91 projects upwardly from the cover 82 to permit the cover 82 to be moved from the closed position to the open position. To permit viewing of the clock display 76 when the cover 82 is in the closed position, the cover 82 includes a transparent window 92, preferably comprising a transparent polycarbonate, that is aligned with the clock display 76 when the cover 82 is closed. Alternatively, the entire cover 82 could be formed from a transparent material.

With reference also to FIG. 3, the upper housing section 24 includes the crescent-shaped tower section 24A, which forms the reservoir 32, and a tubular filter basket section 24B which projects forwardly from the tower section 24A above the platform 28. The one-piece fill port and filter basket support 34 mentioned above, which is best illustrated in FIGS. 3 and 5, comprises a unitary rim 94 which is molded in a suitable thermoplastic material, such as polypropylene, to conform to the perimeter of the top of the upper housing 24. The rear portion of the rim 94, which forms a fill port 96, is generally crescent-shaped. The front portion of the rim 94 forms a generally circular, tubular filter basket support 98.

Figure 5:
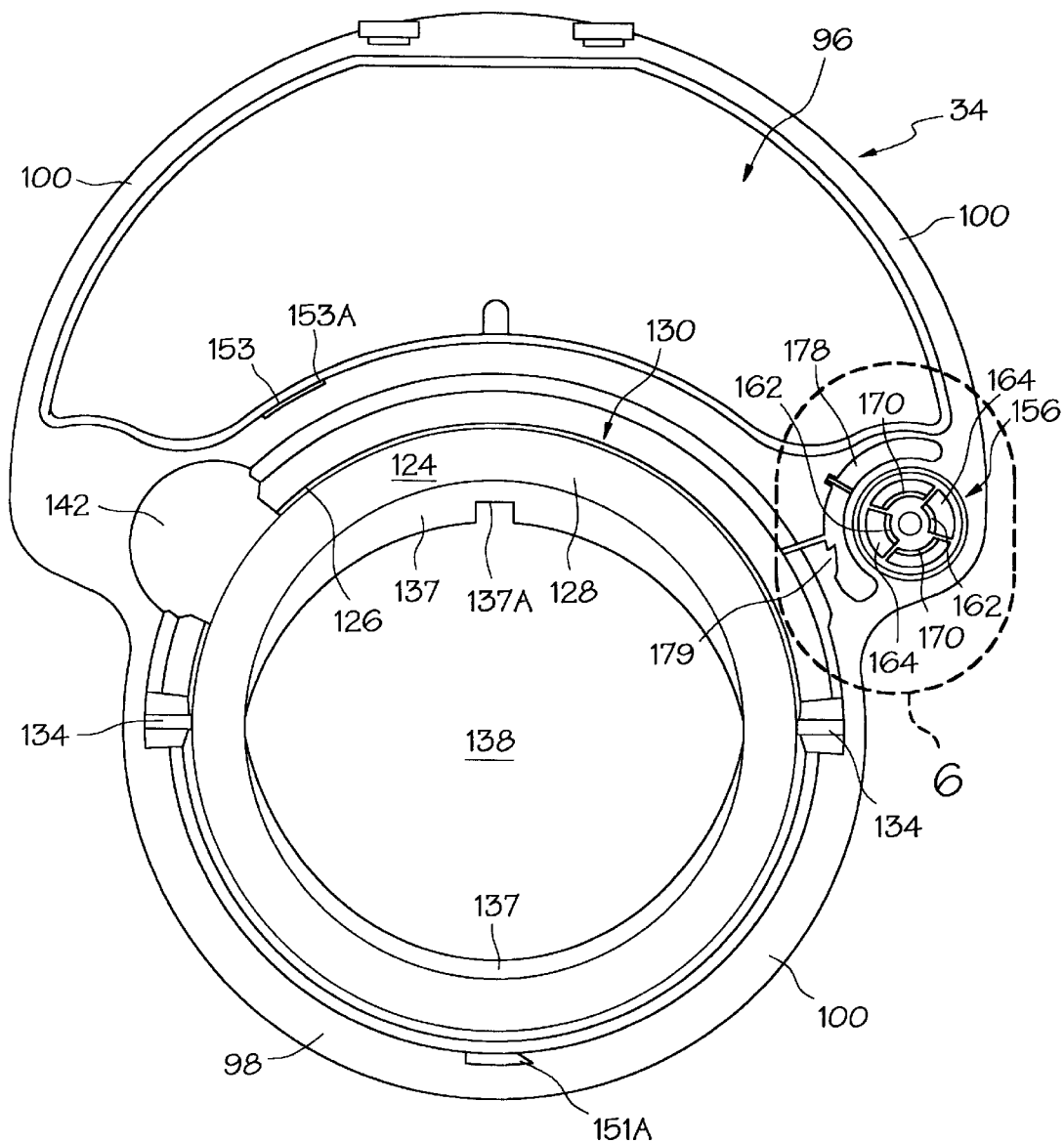
FIG. 5 is a top view of a one-piece, combined fill port and filter basket support member for a coffee maker in accordance with this invention.
Figure 6:
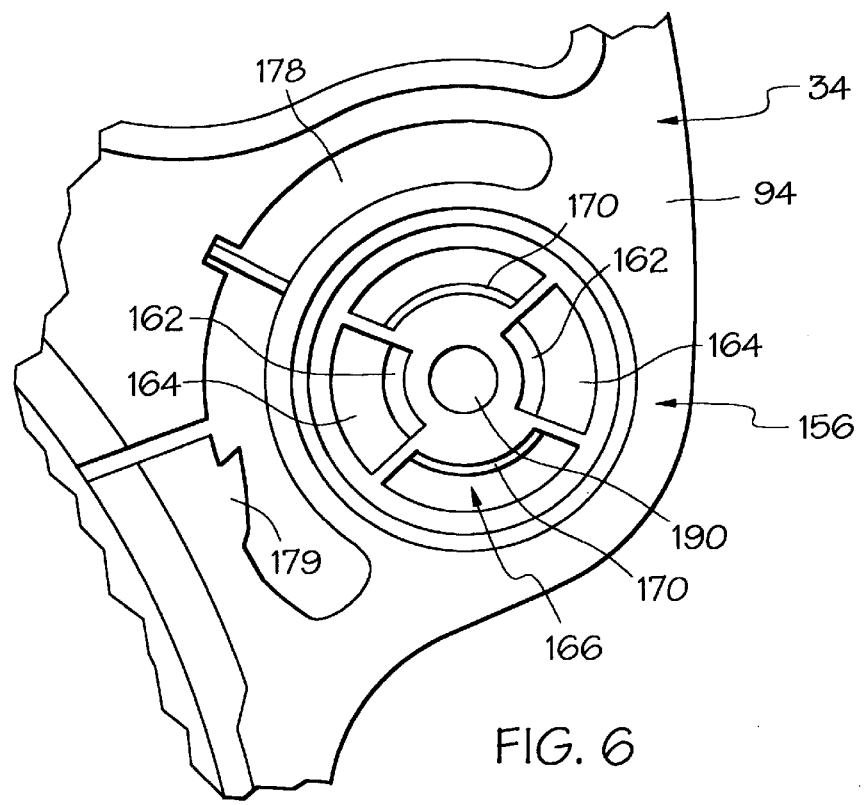
FIG. 6 is an enlarged plan view of the portion of FIG. 5 within the broken line circle 6 of FIG. 5.
Figure 7:
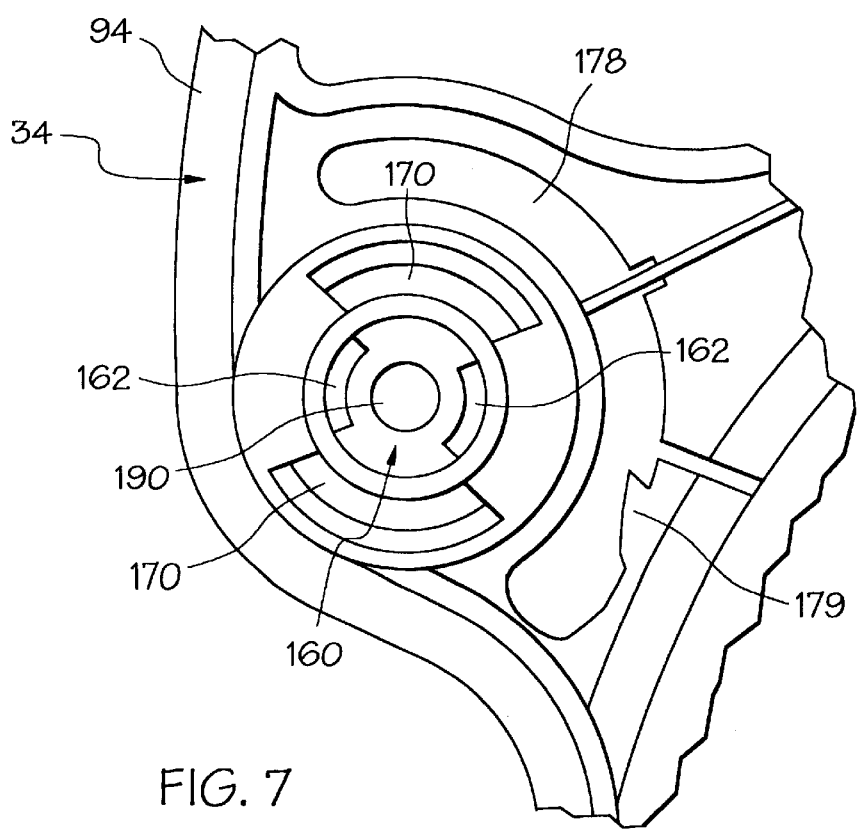
FIG. 7 is a bottom plan view showing the portion of the fill port and filter basket support illustrated in FIG. 6.

Referring to FIGS. 3 and 5, the rim 94 is formed with a horizontally-extending ledge or flange 100 atop a vertically-extending wall 102. The flange 100 is supported by the upper surface of the wall 40 of the upper housing section 24. The wall 102 of the rim 94 conforms to the wall 40 of the upper housing section 24 and has several outwardly-projecting tabs 104 that cooperate with corresponding notches or recesses 106 in the wall 40 of the upper housing section 24 to secure the rim 94 to the upper housing section 24.

As shown in FIGS. 1 and 2, a water reservoir or fill port dust cover 108 is provided above the fill port 96 and is pivotally connected to the rear of the rim 94 for pivotal movement about a horizontal axis. The dust cover 108 is generally crescent-shaped and conforms to the shape of the fill port 96. As common, the dust cover 108 is pivoted to an open position, shown in broken lines in FIG. 2, to permit water to be poured into the water reservoir 32. The dust cover 108 is relatively narrow so that, when opened, it does not add significantly to the overall height of the coffee maker 20.

The tubular filter basket support 98 is constructed to support the filter basket 66 in a single angular orientation. The filter basket 66 has a generally cylindrical upper portion 114, a generally conical center portion 116 and generally cylindrical lower portion 118. However, the interior of the filter basket 66 has a general conical configuration from top to bottom. As common in coffee makers, the filter basket 66 carries a spring-biased pause/serve mechanism 120 (FIG. 2) that permits brewed coffee in the filter basket 66 to flow through a brewed coffee outlet 122 (FIG. 2) in the bottom thereof only when the filter basket 66 is properly supported in the filter basket support 98 and a carafe 31 is properly position beneath the brewed coffee outlet 122.

The tubular filter basket support 98 has an inner wall 124 sized and shaped to conform to the upper portion 114 and center portion 116 of the filter basket 66. In this respect, the inner wall 124 has an upper cylindrical portion 126 and a conical portion 128. The rear of the inner wall 124 is formed with a stair-step or shelf configuration, generally designated 130, which conforms to a corresponding stair-step configuration, generally designated 132, on the rear of the upper margin of the filter basket 66. In addition, a diametrically-opposed pair of upwardly-opening vertical slots 134 is also formed in the wall 124 of the filter basket support 98. The slots 134 receive a corresponding pair of diametrically-opposed tabs 136, only one of which is shown, projecting radially-outwardly from the outer surface of the filter basket 66.

The stair step configurations 130 and 132 on the filter basket support 98 and the filter basket 66, respectively, cooperate with each other in conjunction with the slots 134 and tabs 136 to permit the filter basket 66 to be supported in the filter basket support 98 in only one angular orientation. This ensures that the filter basket 66 will be properly seated and also ensures that the pause/serve mechanism 120 will be properly located for engagement by a carafe 31.

With reference to FIG. 5, the filter basket support 98 has horizontally-extending walls 137 at its lower end that define an opening 138 through which the filter basket 66 extends. The walls 137 are provided so that condensation that forms on or flows down the wall 124 of the filter basket support 98 will not drip onto the housing 22. Instead, the condensation flows over the walls 137 and drips down the outer surface of the filter basket 66. The lower portion 118 of the filter basket 66 is so sized that the condensation drips into the carafe 31 or onto the lid of the carafe 31. Also, a notch 137A is formed in the rearmost wall 137 and receives a guide (not shown) projecting outwardly from the rear of the filter basket 66 to help properly orient the filter basket 66 in the filter basket support.

With reference again to FIG. 3, the filter basket 66 is provided with a pivotal bail 139 which may be grasped to pull the filter basket 66 vertically upwardly from the filter basket support 98. The outer wall of the filter basket 66 is provided with a recessed portion along the rear thereof that receives the bail 139 when it is not in use. To permit the bail 139 to be lifted from its recessed position, the filter basket 66 is also provided with a relief 140 that is received in a correspondingly-shaped depression 142 in the filter basket support 98. The relief 140 permits the bail 139 to be lifted, by a finger for example, from its recessed position.

Figure 8:
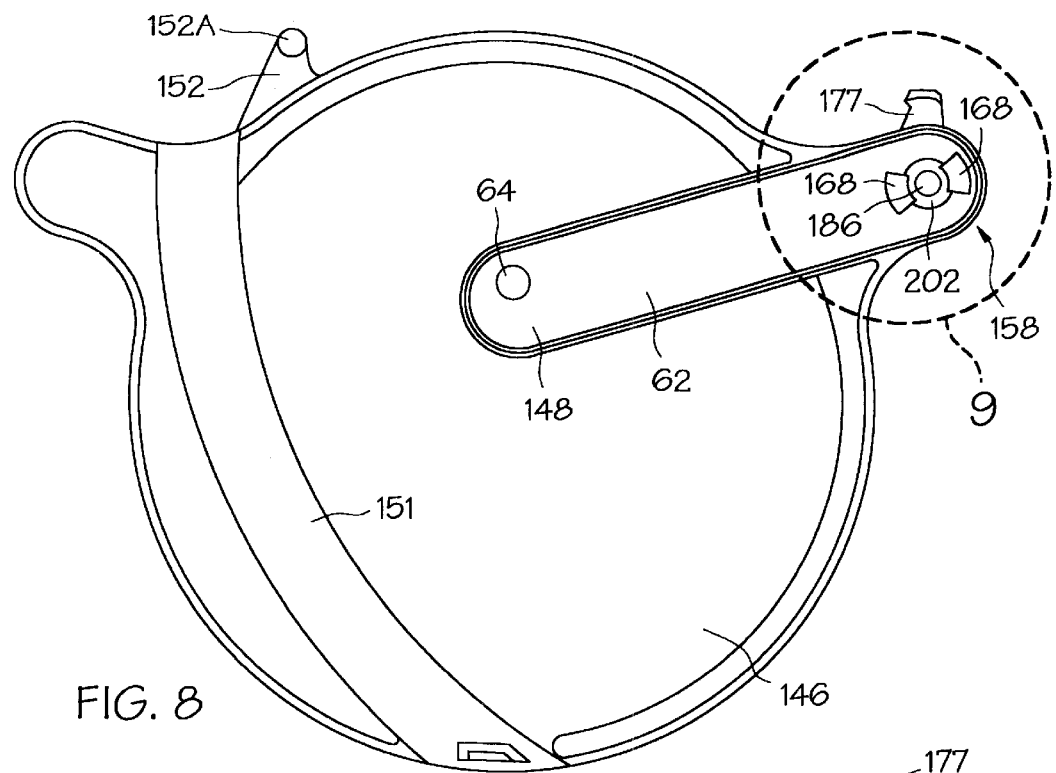
FIG. 8 is a top plan view of a filter basket cover in accordance with this invention.
Figure 9:
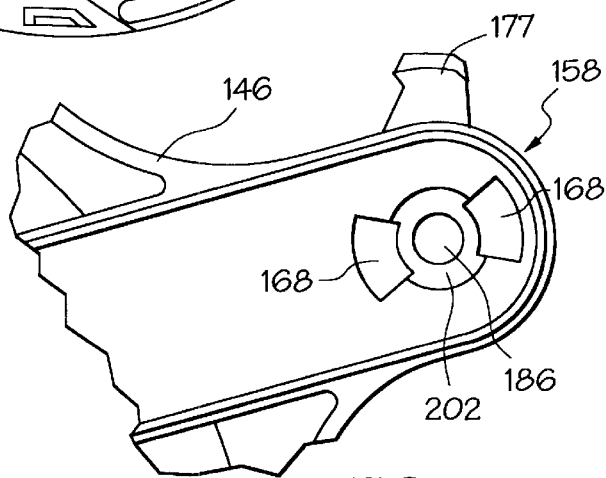
FIG. 9 is an enlarged plan view of the portion of FIG. 8 within the broken line circle 9 of FIG. 8.

Referring now to FIGS. 3 and 8, the coffee maker 20 in accordance with this invention also includes a pivotal or swivel filter basket cover assembly, generally designated 144, which has a top surface which is substantially coplanar with the top surface of the fill port dust cover 108. The filter basket cover assembly 144 is pivotally mounted to the filter basket support 98, as will be described below in detail, and is pivotally movable about a vertical axis between a first or closed position covering the filter basket 66 (when the filter basket 66 is in place) and second or open position providing access to the filter basket 66 for removal. Of course, if the filter basket 66 is not in place in the filter basket support 98, the filter basket 66 can be placed in the filter basket support 98 when the filter basket cover assembly 144 is in the second or open position.

The filter basket cover assembly 144 comprises a one-piece cover plate 146, which includes the water spreader 62 mentioned briefly above, and an upper cover member 147 snap fit to the top of the cover plate 146. The water spreader 62 comprises a channel 148 formed in the plate 146 which receives heated water from the hot water delivery tube 60, as will be described below. Water in the channel 148 passes through the exit aperture 64 provided in the bottom of the channel 148 and into the filter basket 66, as described above. A separate channel cover 150 is provided over the water spreader channel 148 beneath the upper cover member 147. An arcuate guide channel 151 is formed in the cover plate 146 and travels over a guide tab 151A, which tab 151A projects from the rim 94, as the cover plate 94 is pivoted between its open and closed positions. A locking tab 152 having a raised portion 152A is received within an open notch 153 in an upstanding wall 153A on the fill port 96 to retain the cover plate 146 in its closed position.

With reference to FIGS. 3 and 5 through 20, a valve mechanism, generally designated 154, pivotally connects the filter basket cover assembly 144 to the filter basket support 98 and controls the flow of heated water from the hot water delivery tube 60 to the water spreader 62. As explained above, the valve mechanism 154 is provided to prevent heated water from flowing through the water spreader when the cover assembly 144 is pivoted to its open position to provide access to the filter basket support 98 for placement or removal of the filter basket. Such flow of heated water could not only create an undesired mess on the counter top below but could also cause serious injury, such as burns, to a person inadvertently placing a hand or arm beneath the water spreader 62.

The valve mechanism 154 comprises a generally tubular, fixed lower valve portion, generally designated 156, which may be termed the valve body and is integrally molded with the rim 94. The valve mechanism 154 also include a generally cylindrical, rotatable upper valve portion, generally designated 158, which may be termed the valve closure member and is integrally molded with the with the filter basket cover plate 146. The valve body 156 and the valve closure member 158 are preferably molded from a polypropylene thermoplastic, which is the preferred material for the rim 94 and the cover plate 146.

The valve body 156 has a tubular water supply inlet 160 at the lower end thereof that receives the upper end of the hot water supply tube 60. Heated water can flow upwardly into the water supply inlet 160 and through a pair of opposed openings or windows 162 in the inner wall of the water supply inlet 160. The windows 162 open to a corresponding pair of axially-extending, circumferential water supply openings or ports 164 which open upwardly to a cylindrical chamber 166 in the valve body 156.

Figure 11:
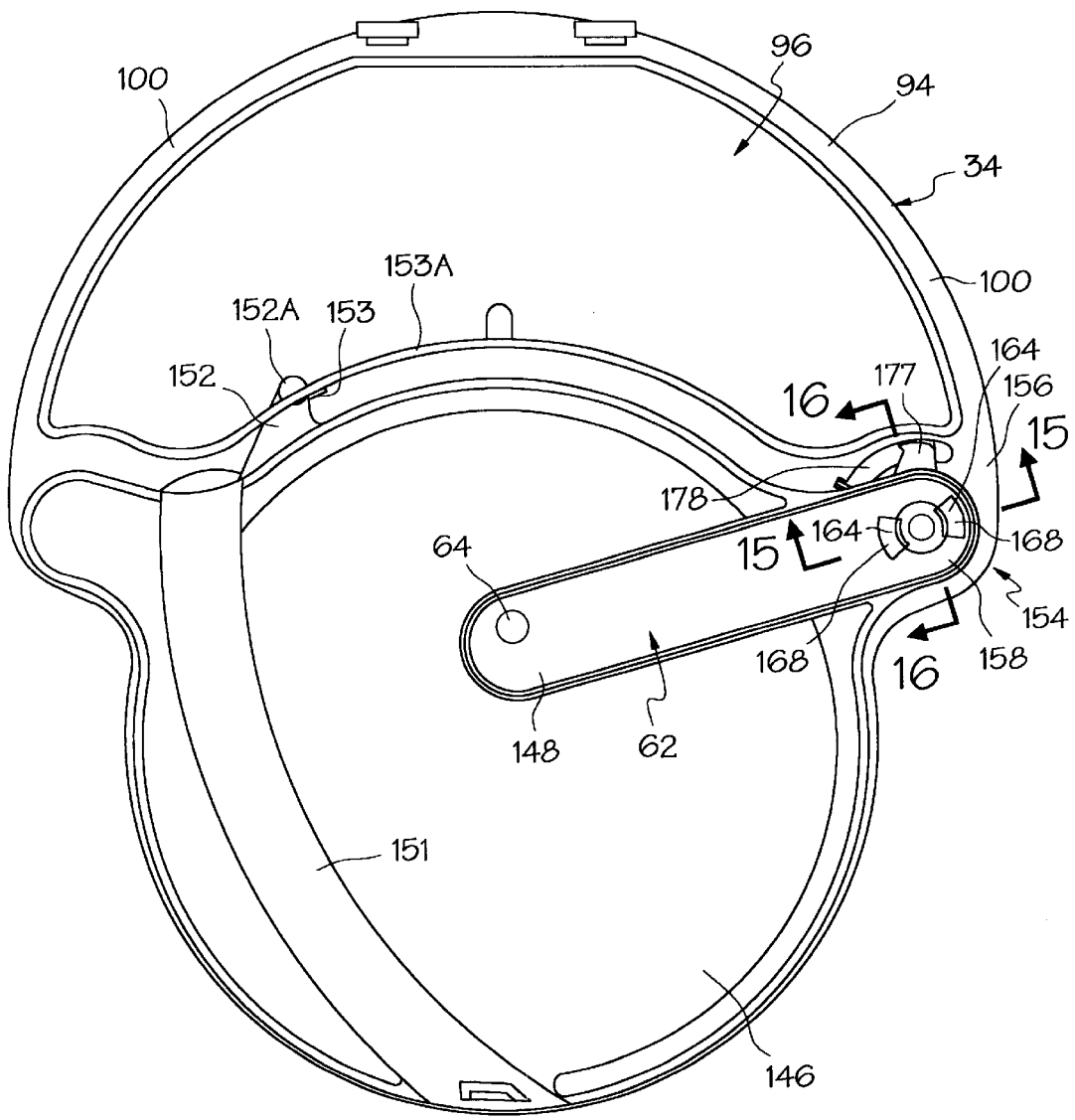
FIG. 11 is top plan view showing the filter basket cover of FIG. 8 assembled onto the combined fill port and filter basket support of FIG. 5. The filter basket cover is in its closed position in FIG. 11.

The valve closure member 158 fits snugly within the chamber 166 in the valve body 156 and can be rotated therein about its vertical center axis. The valve closure member 158 includes a pair of axially-extending water delivery openings or ports 168 that are substantially the same size and shape as the water supply ports 164 in the valve body 156. The water delivery ports 168 open upwardly to the channel 148 of the water spreader 62. When the cover plate 146 is in its closed position over the filter basket support 98, as shown in FIG. 11, the valve closure member 158 is oriented so that the water delivery passageways 168 are aligned with and overlie the water supply passageways 164 in the valve body 156. Thus, when the cover plate 146 is in its closed position, water from the hot water delivery tube 60 can flow through the windows 162, through the aligned water supply ports 164 and water delivery ports 168, and into the channel 148 of the water spreader 62. As evident, the heated water will then fall through the exit aperture 64 and onto coffee grounds in the filter basket 66, as described above.

To prevent heated water from passing through the exit aperture 64 when the cover plate 146 is not above the filter basket support 98, the valve mechanism 154 is constructed so that heated water from the hot water delivery tube 60 will be returned to the water reservoir 32, when the cover plate 146 is moved toward its opened position. To this end, the valve body 156 also includes a pair of axially-extending, circumferential water return openings or ports 170 that, for reasons which will become apparent, are longer in arc length than the water supply ports 164. As best shown in FIG. 5, the water return ports 170 and the water supply ports 164 are defined and separated by four walls or vanes 172.

The valve closure member 158 is formed with an opposed pair of reliefs 174 that open upwardly to a corresponding pair of water return pockets 176, which reliefs 174 and pockets 176 are substantially the same size and shape as the water return ports 170. As now apparent, the reliefs 174 and the water return pockets 176 are aligned with and overlie the corresponding water return ports 170 in the valve body 156 when the filter basket cover plate 146 is closed. Thus, water being supplied to the water spreader 62 cannot pass into the return ports 170 when the cover plate 146 is closed.

As the cover plate 146 is pivoted from its closed position and the valve closure member 158 rotates counterclockwise, as viewed from above, each water delivery port 168 becomes partially aligned with both its corresponding water supply port 164 and the neighboring (in the counterclockwise direction) water return port 170. At the same time, each relief 174 and water return pocket 176 also becomes partially aligned with both its corresponding water return port 170 and the neighboring (in the counterclockwise direction) water supply port 164.

Figure 12:
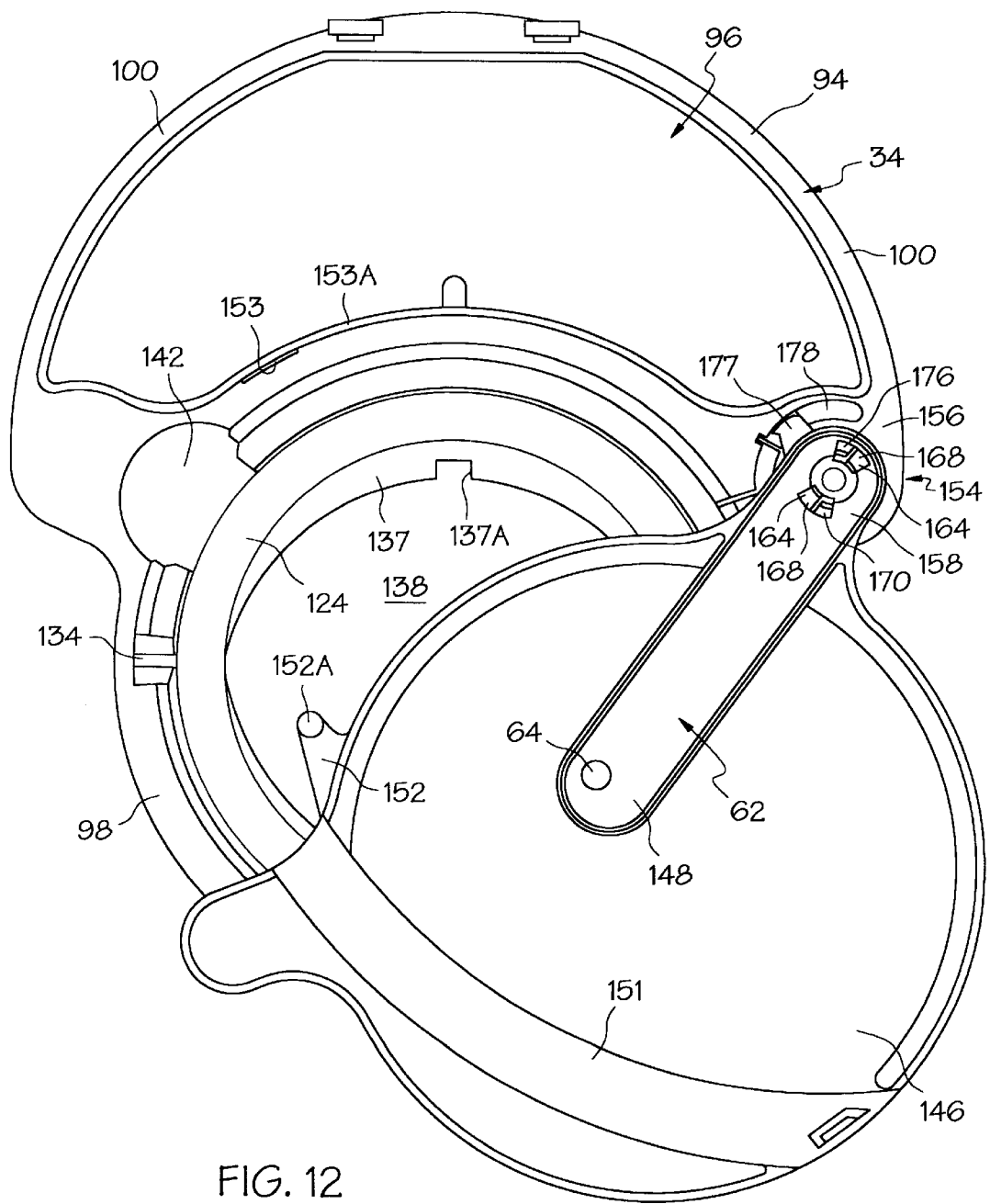
FIG. 12 is top plan view similar FIG. 11 but showing the filter basket cover pivoted partially towards its fully open position.

With the cover plate 146 partially opened, as shown in FIG. 12, water that passes from a supply port 164 to a water delivery port 168 in the valve closure member 158 will most likely follow the path of least resistance, which is downward through the neighboring water return port 170 partially aligned with the water delivery port 168. Of course, the water may have sufficient momentum so as to travel upwardly to the water spreader 62. This does not present a hazard because the exit aperture 64 of the water spreader 62 is still above the filter basket support 98.

Heated water will also pass from each water supply port 164 into the corresponding relief 174 and water return pocket 176. This water is directed above the neighboring water return port and falls, due to gravity, back into the water reservoir 32. Thus, little, if any, heated water is supplied to the water spreader 62 once the cover plate 146 is moved from its closed position.

Figure 13:
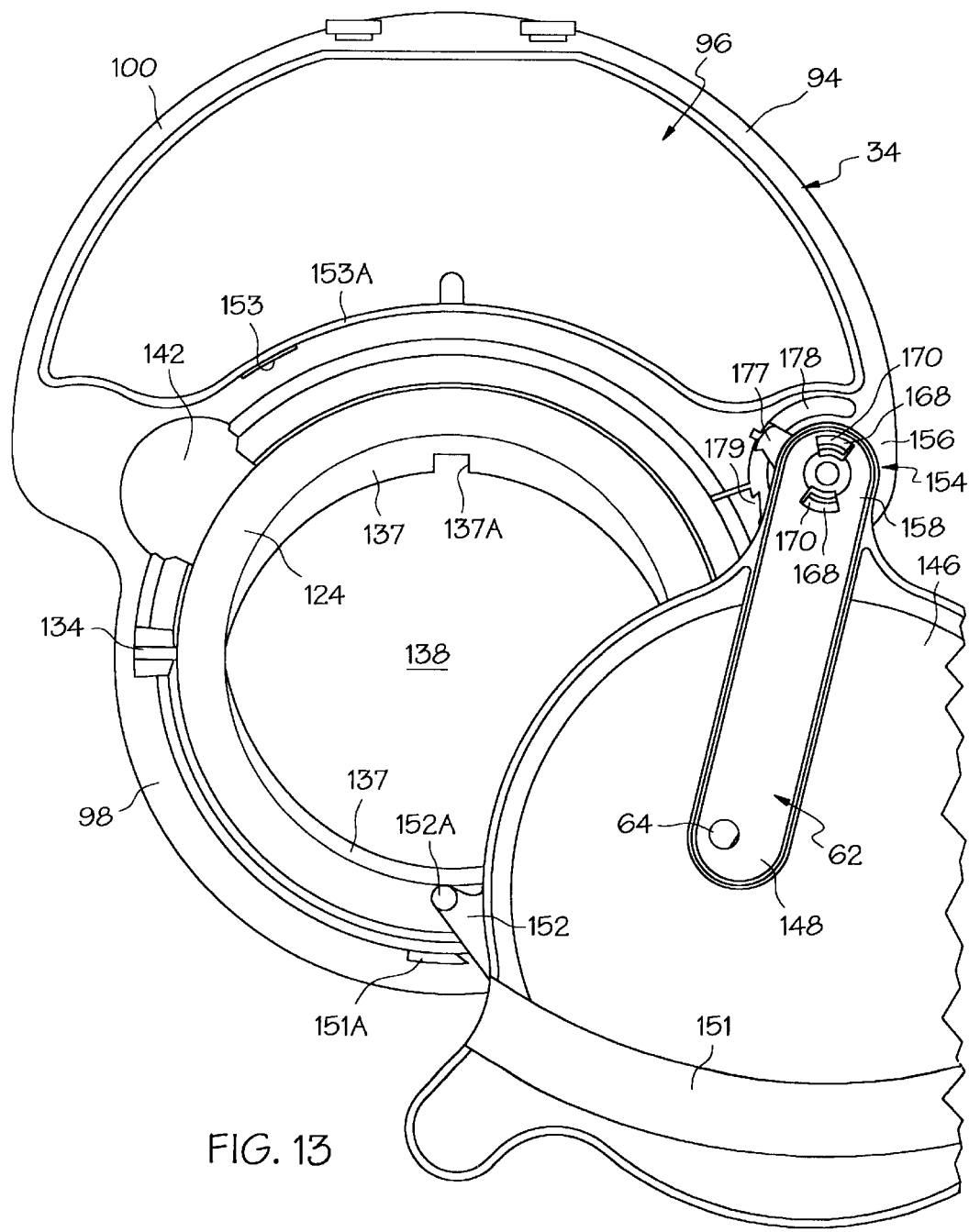
FIG. 13 is a fragmentary top plan view similar to FIG. 12 but showing the filter basket cover pivoted further towards its fully open position.

With reference to FIG. 13, as the cover plate 146 is pivoted further toward its fully open position so that the exit aperture 64 of the water spreader 62 is located just above the outer margin of the filter basket support 98, the valve closure member 158 is oriented so that the water delivery ports 168 are completely out of alignment with their corresponding water supply ports 164 in the valve body 156 and completely overlie the neighboring water return ports 170. Water from the water supply ports 164 is blocked from passing into the water delivery ports 168 and into the water spreader 62. Instead, the water flows into the reliefs 174 and water return pockets 176 which are each aligned with and overlie both a water supply port 164 and its neighboring (in the clockwise direction) return port 170. As apparent, the water from the water supply ports 164 is directed above the water return ports 170 and falls, dues to gravity, back into the water reservoir 32.

Figure 14:
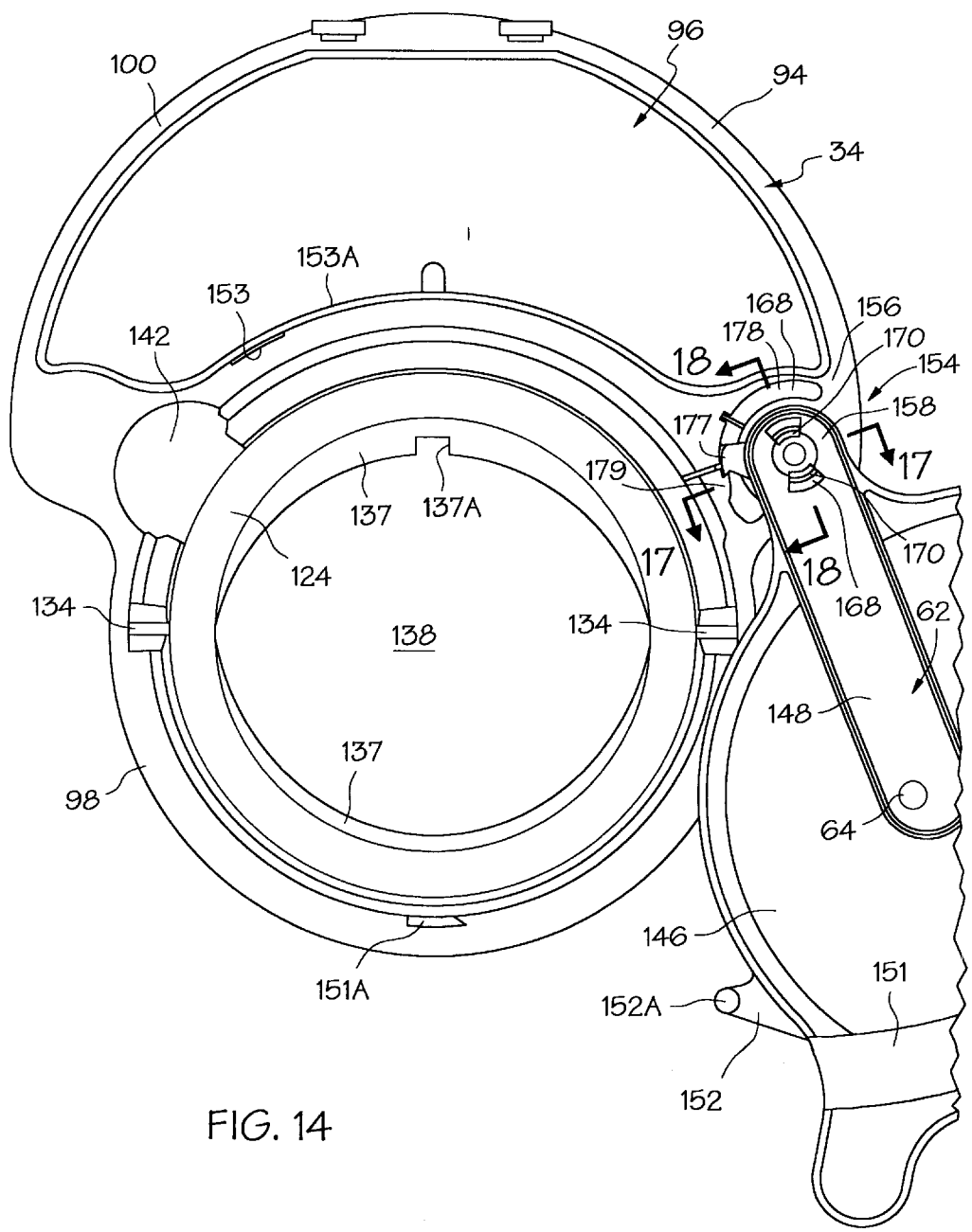
FIG. 14 is a fragmentary top plan view similar to FIG. 13 but showing the filter basket cover pivoted to its fully open position.
Figure 15:
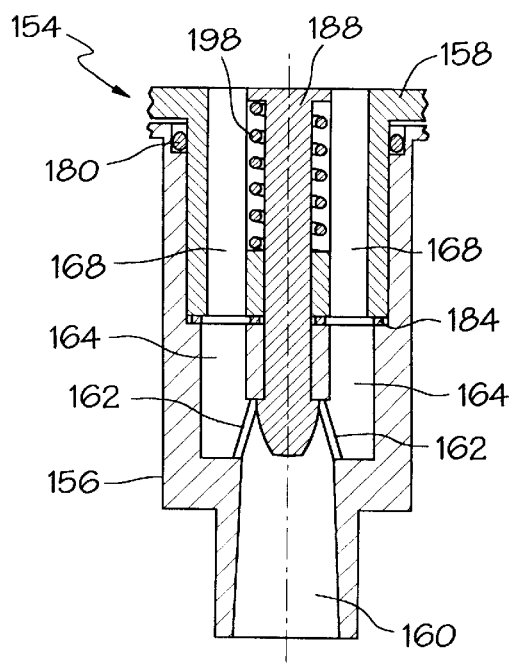
FIG. 15 is a fragmentary sectional view taken along line 15—15 of FIG. 11.
Figure 16:
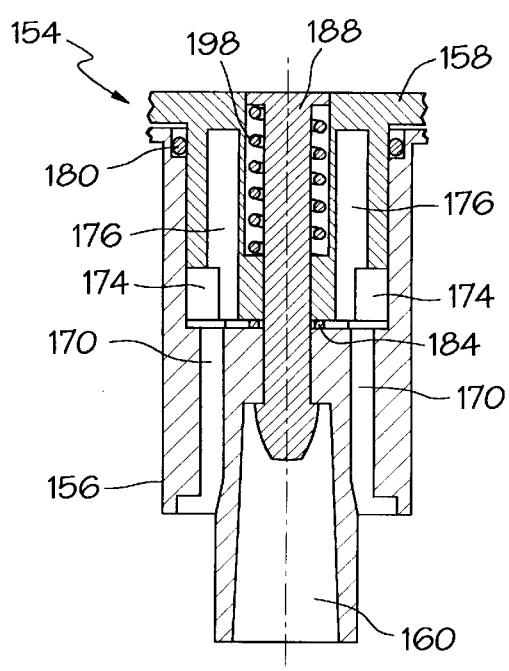
FIG. 16 is a fragmentary sectional view taken along line 16—16 of FIG. 11.
Figure 17:
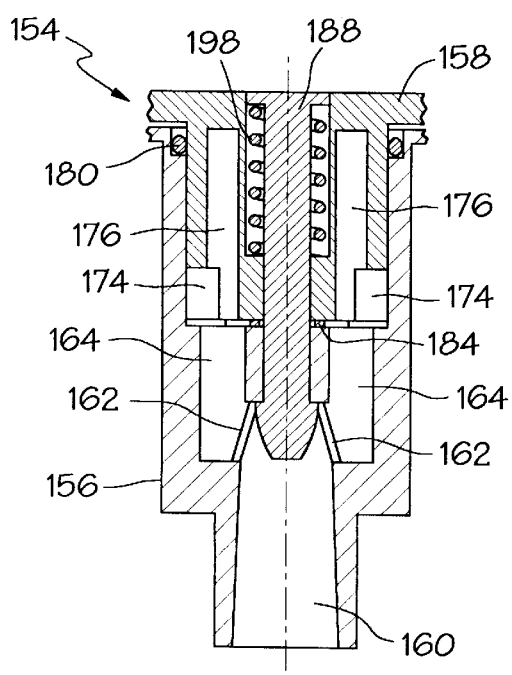
FIG. 17 is a fragmentary sectional view taken along line 17—17 of FIG. 14.
Figure 18:
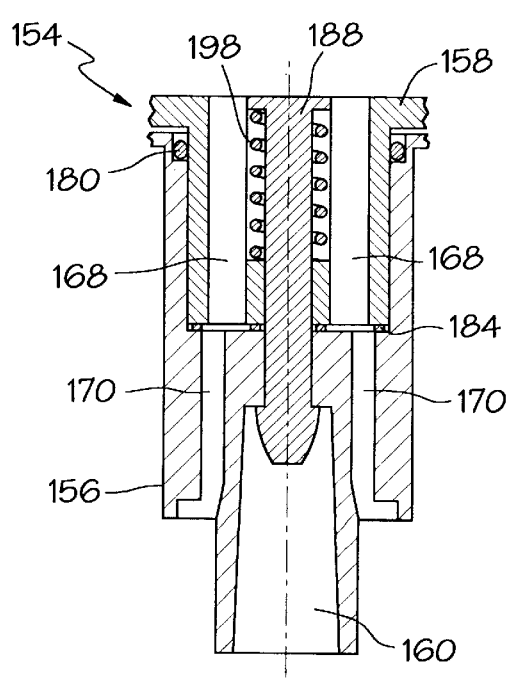
FIG. 18 is a fragmentary sectional view taken along line 18—18 of FIG. 14.
Figure 19:
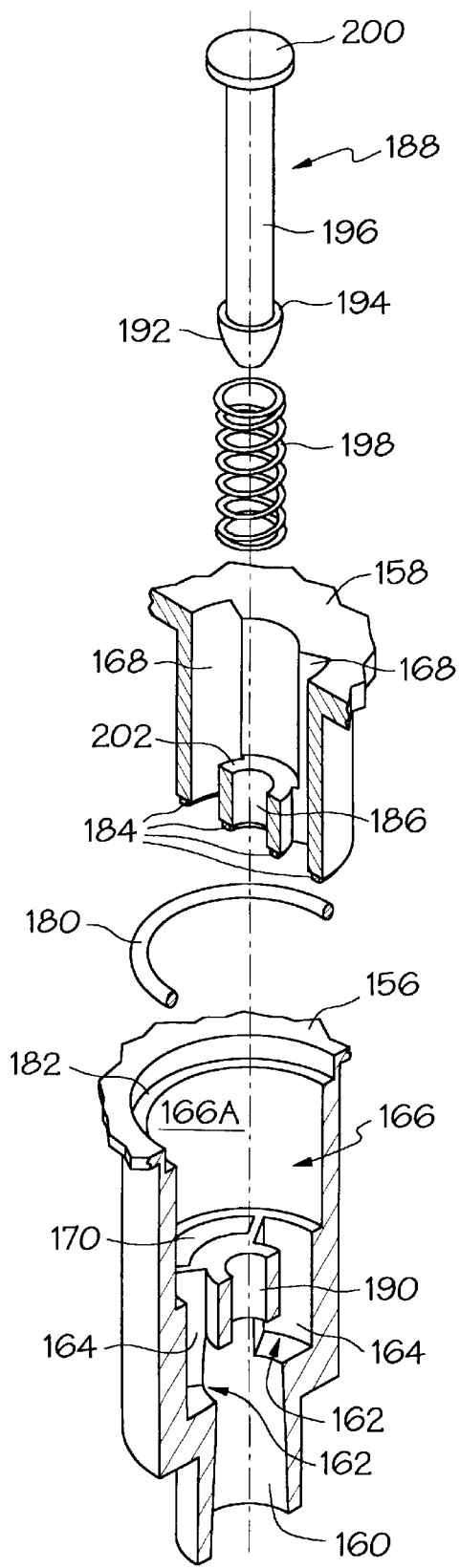
FIGS. 19 and 20 are exploded, partially fragmentary, perspective views of the preferred embodiment of a valve mechanism in accordance with this invention. The valve mechanism of FIGS. 19 and 20 is shown in section in FIGS. 15 through 18.
Figure 20:
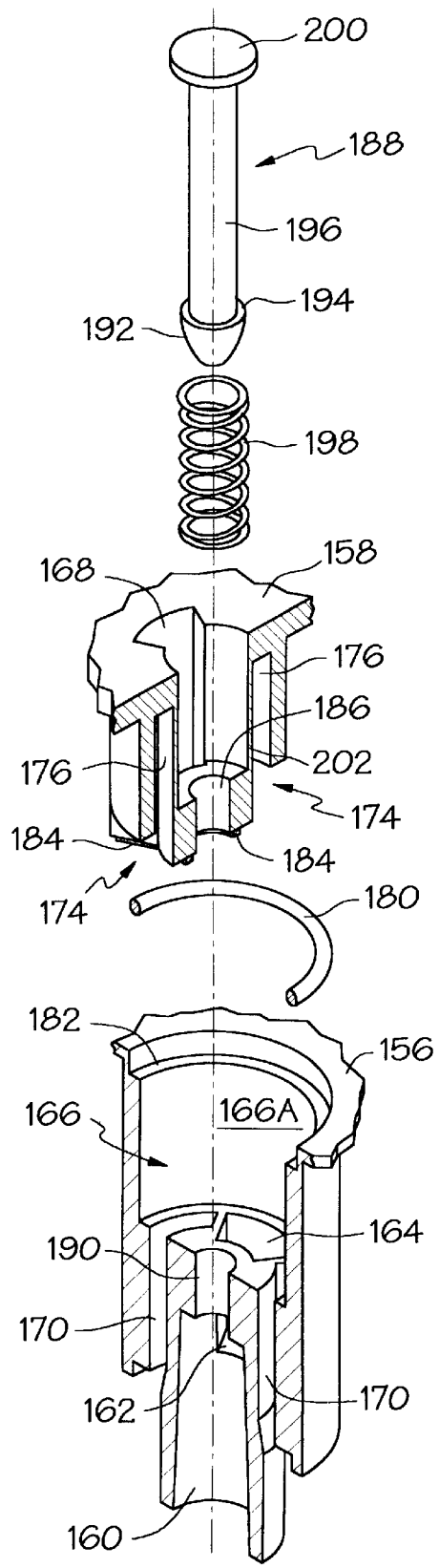

FIG. 14 illustrates the filter basket cover plate 146 pivoted to its fully open position in which a depending guide tab 177 engages a confronting stop 178 projecting into a guide slot 179 in the filter basket support 94. As the cover plate 146 is pivoted from the partially open position of FIG. 13 to the fully open position of FIG. 14, water from the hot water delivery tube 60 continues to be recycled into the water reservoir 32 by the valve mechanism 154. As the valve closure member 158 rotates with the cover plate 146, each relief 174 and water return pocket 176 in the valve closure member 158 moves so that it becomes aligned with and overlies both a water supply port 164 and its neighboring (in the counterclockwise direction) water return port 170. Thus, water from the water supply ports 164 continues to be blocked from passing into the water delivery ports 168 in the valve closure member 158 and falls through the return ports 170 into the water reservoir 32.

One skilled in the art will recognize that the valve mechanism 154 may be formed with only a single water supply port 164, water delivery port 168, water return port 170, and water return pocket 176. However, two of each component or structure is preferred.

Figure 10:
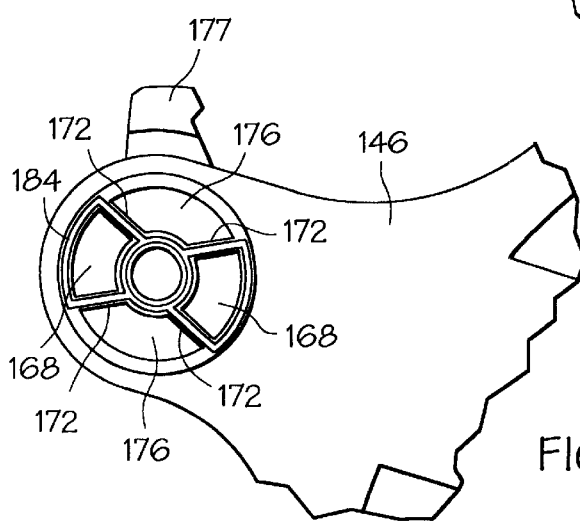
FIG. 10 is a bottom plan view showing the portion of the filter basket cover illustrated in FIG. 6.

With reference to FIGS. 15 through 20, a silicone rubber O-ring 180 is preferably provided around the valve closure member 158 against the lower surface of the cover plate 146. The O-ring 180 is supported on a circular ledge 182 at the upper end of the chamber 166 and prevents water that flows into the reliefs 174 and the water return pockets 176 from passing out of the chamber 166 between the wall 166A thereof and the valve closure member 158. Referring also to FIG. 10, a gasket 184 is insert molded integrally to the bottom of the valve closure member 158. The gasket 184 is preferably formed from a thermoplastic elastomer material, such as material commonly referred to as saniprene, and provides a water-tight seal around the bottom openings of the water delivery ports 168, as well as around a central passageway 186, the purpose of which will be described below.

The cover plate 146 and valve closure member 158 are secured to the filter basket support 98 and the valve body 156 by a stainless steel fastening pin 188 that extends through the central passageway 186 in the valve closure member 158 and through an aligned passageway 190 in the valve body 156. The pin 188 has a conical lower end 192 that forms an upwardly facing shoulder 194 which is slightly larger in diameter that the shaft 196 of the pin 188. The shoulder 194 prevents the pin 188 from being removed upwardly from the passageways 186 and 190 once inserted therein. A coil spring 198 is disposed around the shaft 196 of the pin 188 and compressed between the head 200 thereof and an upwardly-facing surface 202 on the valve closure member 156. As a result, the valve closure member 158 and the valve body 156 are held together tightly and a proper seal by the gasket 184 is ensured.

One skilled in the art will recognize that the valve closure member 158 and the valve body 156 are also held together by the entrapment of the guide tab 177 within the guide slot 179, even when the pin 188 is removed. The stop 178 projecting into the guide slot 179 may be momentarily moved to an out-of-the-way position to permit the tab 177 to pass into a widened portion of the guide slot 179, thereby permitting removal of the tab 177 from the guide slot 179.

Figure 21:
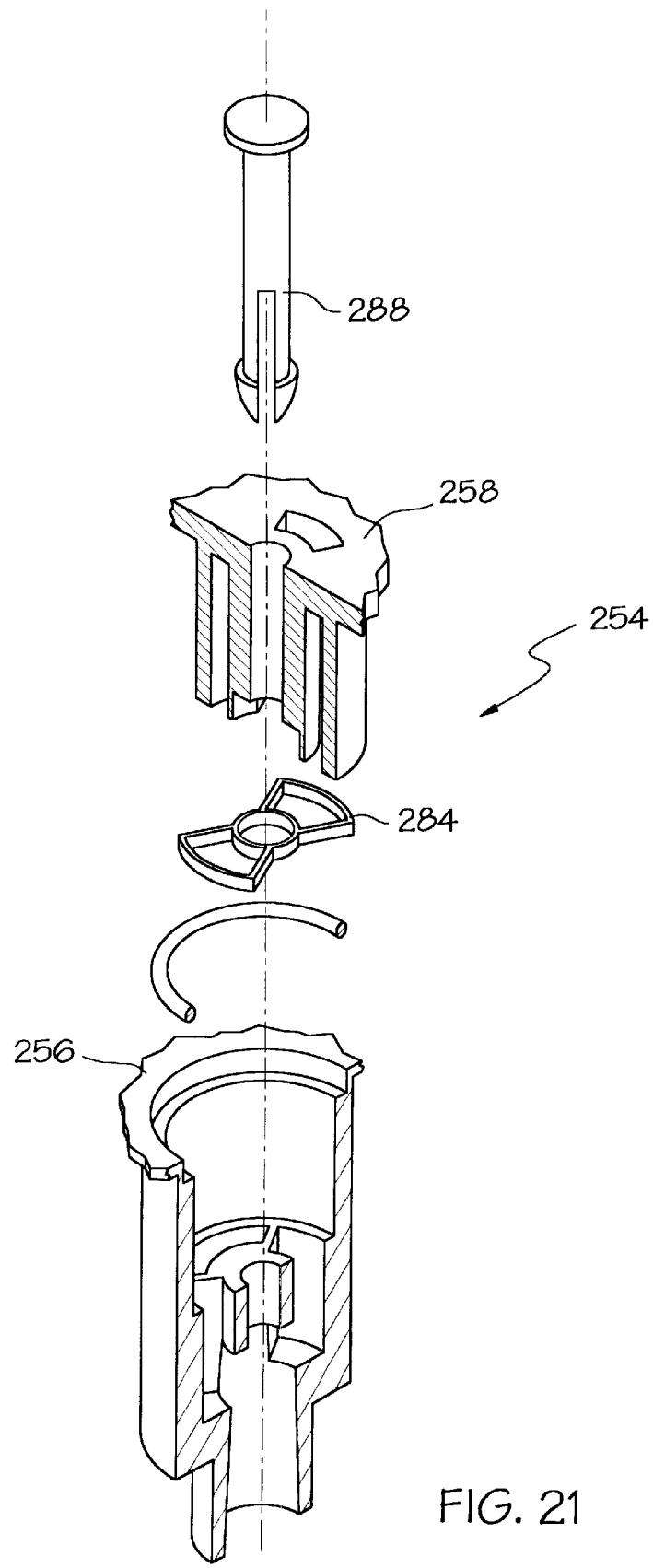
FIG. 21 is an exploded, partially fragmentary perspective similar to FIG. 19 but showing a second embodiment of a valve mechanism.

FIG. 21 illustrates a second embodiment of a valve mechanism, generally designated 254. The valve mechanism 254 operates in substantially the same manner as the preferred valve mechanism 154, but has a slightly different construction. For example, the valve closure member 258 and the valve body 256 of the valve mechanism 254 are held together by a plastic, push-in fastener pin 288 having a bifurcated conical lower end 292 and no bias spring is used. Also, the gasket 284 of the embodiment illustrated in FIG. 21 is not integrally molded with the valve closure member 258. Rather, it is a separate part. In addition, the valve closure member 254 does not include the reliefs 174 present on the preferred valve closure member 158.

Although the presently preferred embodiments of this invention have been described, it will be understood that within the purview of the invention various changes may be made within the scope of the following claims.

Having thus described our invention, we claim:

1. A coffee maker, comprising:
   a housing defining a water reservoir;
   a filter basket support carried by said housing in fixed relation thereto;
   a filter basket having an upper opening and removably supported in said filter basket support;
   a filter basket cover carried by said housing sized and shaped to completely cover said opening and pivotally movable relative to said housing about a vertical axis, said filter basket cover being pivotal about said vertical axis between a closed position covering said filter basket opening and an open position providing access through said opening to said filter basket for removal thereof from said filter basket support, said filter basket cover having a hot water exit aperture;
   an automatic drip heater assembly in said housing communicating with said reservoir; and
   a hot water delivery tube delivering heated water from said heater assembly to said filter basket through said hot water exit aperture in said filter basket cover.

2. The coffee maker of claim 1 further comprising a valve assembly intermediate said hot water delivery tube and said filter basket, said valve assembly preventing heated water from being delivered through said hot water exit aperture when said filter basket cover is in said open position.

3. The coffee maker of claim 2 wherein said filter basket cover is pivotally mounted on said filter basket support.

4. The coffee maker of claim 3 wherein said valve assembly comprises a fixed valve body and a rotatable valve closure member disposed within said valve body.

5. The coffee maker of claim 4 wherein said valve body is integral with said filter basket support and said valve closure member is integral with said filter basket cover.

6. The coffee maker of claim 1 wherein said housing includes a platform for supporting a carafe, said platform having a front surface on which controls for said coffee maker are located, and wherein said coffee maker further comprises a control cover pivotally mounted on said platform and movable to a closed position covering said surface.

7. The coffee maker of claim 6 further comprising an electronic controller including a timer capable of initiating a brewing cycle at a preset time and manually-operable control buttons located on said front surface of said platform.

8. The coffee maker of claim 7 wherein said electronic controller includes a clock display located on the front surface of said platform, and wherein said cover has a window which permits viewing of said clock display when said control cover is in said closed position.

9. The coffee maker of claim 1 wherein said filter basket cover includes a horizontally-extending locking tab, and wherein said filter basket support includes an upstanding wall having a notch formed therein for receiving said locking tab when said filter basket cover is in said closed position.

10. A coffee maker, comprising:
    a housing defining a water reservoir;
    a filter basket support carried by said housing in fixed relation thereto;

a filter basket removably supported in said filter basket support;

a water spreader mounted on said filter basket support and pivotal relative thereto about a vertical axis, said water spreader being pivotal between a first position wherein said water spreader is over said filter basket and a second position providing access to said filter basket for removal thereof from said filter basket support;

an automatic drip heater assembly in said housing communicating with said reservoir; and a hot water delivery tube delivering heated water from said heater assembly to said water spreader.

11. The coffee maker of claim 10 further comprising a valve assembly intermediate said hot water delivery tube and said water spreader, said valve assembly permitting heated water to be delivered to said water spreader only when said water spreader is in said first position.

12. The coffee maker of claim 11 wherein said valve assembly comprises a fixed valve body and a rotatable valve closure member disposed within said valve body.

13. The coffee maker of claim 12 wherein said valve body is integral with said filter basket support and said valve closure member is integral with said water spreader.

14. The coffee maker of claim 10 wherein said water spreader is integral with a filter basket cover which covers said filter basket when said water spreader is in said first position.

15. The coffee maker of claim 1 wherein said filter basket includes a pivotal bail which may be grasped to remove the filter basket from the filter basket support.

16. In a coffee maker comprising a housing defining a water reservoir, a filter basket support carried by said housing, a filter basket having an upper opening and removably supported in said filter basket support, and a filter basket cover sized and shaped to completely cover said opening disposed above said filter basket, the improvement wherein said filter basket cover is carried by said housing for pivotal movement about a vertical axis.

17. A coffee maker, comprising:

a housing defining a filter basket support and a water reservoir having a fill port;

a filter basket supported in said filter basket support;

an automatic drip heater assembly communicating with said water reservoir;

a hot water delivery tube delivering heated water from said heater assembly to said filter basket;

a filter basket cover disposed above said filter basket support and the filter basket therein, said filter basket cover being pivotal relative to said housing about a vertical axis to expose said filter basket support; and a water reservoir cover disposed above said water reservoir, said water reservoir cover being pivotal relative to said housing about a horizontal axis to expose said water reservoir fill port.

\* \* \* \* \*